United States Patent
Park et al.

(10) Patent No.: US 9,019,443 B2
(45) Date of Patent: Apr. 28, 2015

(54) BACKLIGHT UNIT COMPRISING A PLURALITY OF SLITS FORMED ON A BOTTOM SURFACE OF AT LEAST ONE EDGE OF A BOTTOM COVER AND LIQUID CRYSTAL DISPLAY DEVICE HAVING THE SAME

(75) Inventors: Heong Soo Park, Gyeonggi-do (KR); Kyung Sik Dan, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 477 days.

(21) Appl. No.: 12/850,183

(22) Filed: Aug. 4, 2010

(65) Prior Publication Data

US 2011/0032447 A1 Feb. 10, 2011

(30) Foreign Application Priority Data

Aug. 5, 2009 (KR) .................. 10-2009-0072060

(51) Int. Cl.
- G02F 1/1335 (2006.01)
- G09F 13/04 (2006.01)
- F21V 7/04 (2006.01)
- F21V 8/00 (2006.01)
- G02F 1/1333 (2006.01)

(52) U.S. Cl.
CPC ............ G02B 6/0068 (2013.01); G02B 6/0085 (2013.01); G02F 1/133308 (2013.01); G02B 6/0073 (2013.01); G02F 1/133615 (2013.01); *G02F 2001/133314* (2013.01); *G02F 2001/133628* (2013.01); *G02F 2201/54* (2013.01)

(58) Field of Classification Search
USPC .............. 349/62–64, 69; 362/97.1–97.4, 600, 362/612
See application file for complete search history.

(56) References Cited

U.S. PATENT DOCUMENTS

| 2008/0088763 A1* | 4/2008 | Toriyama et al. | 349/58 |
| 2008/0106911 A1* | 5/2008 | Park et al. | 362/612 |
| 2009/0096957 A1* | 4/2009 | Hiyama et al. | 349/65 |

FOREIGN PATENT DOCUMENTS

| KR | 10-2005-005167 A | 1/2005 |
| KR | 10-2008-0060863 A | 7/2008 |

\* cited by examiner

*Primary Examiner* — Paul Lee
(74) *Attorney, Agent, or Firm* — Morgan, Lewis & Bockius LLP

(57) ABSTRACT

A backlight unit adapted to prevent light leakage and damage of its internal components due to a thermal deformation is disclosed.

The backlight unit includes: a bottom cover with an opened upper surface; a printed-circuit-board disposed on at least one inner side surface of the bottom cover; a plurality of LEDs loaded on the printed-circuit-board; and a plurality of slits formed on at least one edge of the bottom cover opposite to the printed-circuit-board and configured to reduce thermal deformation of the bottom cover.

12 Claims, 4 Drawing Sheets

BACKLIGHT UNIT COMPRISING A PLURALITY OF SLITS FORMED ON A BOTTOM SURFACE OF AT LEAST ONE EDGE OF A BOTTOM COVER AND LIQUID CRYSTAL DISPLAY DEVICE HAVING THE SAME

CROSS-REFERENCE TO RELATED APPLICATION

This application claims priority under 35 U.S.C. 119 to Korean Patent Application No. 10-2009-0072060, filed on Aug. 5, 2009, which is hereby incorporated by reference in its entirety.

BACKGROUND

1. Field of the Disclosure

This disclosure relates to a backlight unit, and more particularly to a backlight unit adapted to prevent light leakage caused by a thermal deformation, and a liquid crystal display (LCD) device with the same.

2. Description of the Related Art

Cathode ray tubes (CRTs), which correspond to one of widely used display devices, are mainly used as monitors for TVs, measuring apparatuses, or information terminals. However, the heavy weight and large size of the CRTs have been a major hindrance to the manufacturing of small, light electronic products.

To address this matter, LCD devices are gradually being used in a wide range of applications due to their advantages such as lightness, thinness, and low power consumption. Accordingly, LCD devices are being manufactured to have even larger screens, be thinner, and consume less power, in order to meet requirements of users. Such LCD devices display images by controlling the amount of light transmitted through liquid crystal.

LCD devices are not self-illuminating display devices, unlike CRTs. As such, an LCD device includes a backlight unit provided on the rear surface of an LCD panel. The backlight unit includes a separated light source providing light necessary to display an image. Actually, the backlight unit employs cold cathode fluorescent lamps (CCFLs) with electrodes encompassing both end circumferences of a lamp, external electrode fluorescent lamps (EEFLs) with electrodes inserted into both ends of a lamp, light emitting diodes (LEDs), or others, as a light source. Recently, LEDs are being mainly used as the light source of a backlight unit because they are suitable for the slimness and low power consumption of the backlight unit.

A backlight unit of the related art employing the LEDs as a light source is configured to include a box-shaped bottom cover with an opened surface and a metal printed circuit board (PCB) disposed on at least one inner side surface and loaded with a plurality of LEDs. The bottom cover is formed from a metal material. The backlight unit is further configured to include a light guide plate disposed parallel to the plurality of LEDs. The light guide plate converts spotted lights from the plurality of LEDs into a two-dimensional light and applies the two-dimensional light to a LCD panel which is disposed on it.

The LEDs are most suitable to make slimness and low power consumption of the backlight unit, as described above. On the other hand, the lifespan of LEDs can be reduced by heat generated during the driving of the LEDs.

The metal PCB disposed on the inner side surface of the bottom cover transfers heat generated in the plurality of LEDs to the bottom cover which is formed from a metal material. Therefore, the related art backlight unit can prevent the reduction of the LED lifespan.

However, since the related art backlight unit forces the heat generated in the plurality of LEDs to be transferred to the side surface of the bottom cover, the heat is concentrated to the side surface of the bottom cover. As such, the bottom cover is deformed by the heats concentrated to its side surface. This results from the fact that the bottom cover of a metal material easily expands and contracts with heat.

More specifically, the concentrated heat forces the side surface of the bottom cover to be thermally deformed to have a bent shape. Due to this, components within the bottom cover can be damaged. Also, the bent side surface of the bottom cover causes light to be leaked from the edge of the bottom cover, so that brightness of the backlight unit (and the LCD device) is deteriorated. Consequently, the thermal deformation of the bottom cover can deteriorate displaying quality of the LCD device.

BRIEF SUMMARY

Accordingly, the present embodiments are directed to a backlight unit that substantially obviates one or more of problems due to the limitations and disadvantages of the related art, and an LCD device with the same.

An object of the present embodiments is to provide a backlight unit that is adapted to prevent light leakage and damage of its internal components due to a thermal deformation.

Another object of the present embodiments is to provide an LCD device that is adapted to improve displaying quality.

Additional features and advantages of the embodiments will be set forth in the description which follows, and in part will be apparent from the description, or may be learned by practice of the embodiments. The advantages of the embodiments will be realized and attained by the structure particularly pointed out in the written description and claims hereof as well as the appended drawings.

According to one general aspect of the present embodiment, a backlight unit includes: a bottom cover with an opened upper surface; a printed-circuit-board disposed on at least one inner side surface of the bottom cover; a plurality of LEDs loaded on the printed-circuit-board; and a plurality of slits formed on at least one edge of the bottom cover opposite to the printed-circuit-board and configured to reduce thermal deformation of the bottom cover.

An LCD device according to another general aspect of the present embodiment, includes: a liquid crystal display panel; a bottom cover configured to include an opened upper surface and disposed under the liquid crystal display panel; a printed-circuit-board disposed on at least one inner side surface of the bottom cover; a plurality of LEDs loaded on the printed-circuit-board; and a plurality of slits formed on at least one edge of the bottom cover opposite to the printed-circuit-board and configured to reduce thermal deformation of the bottom cover.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated in and constitute a part of this application, illustrate embodiment(s) of the invention and together with the description serve to explain the disclosure. In the drawings.

DETAILED DESCRIPTION

Figure 1:
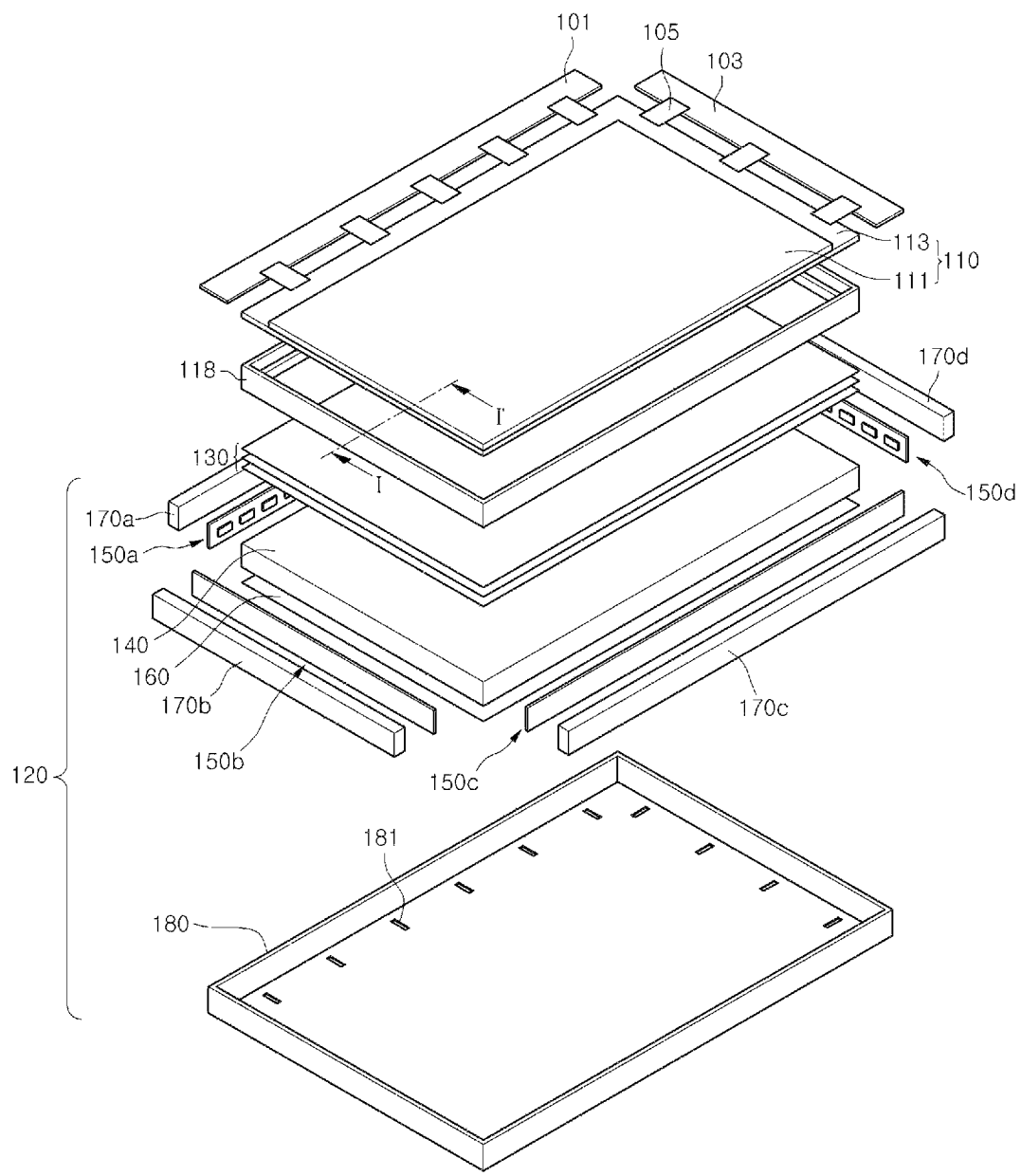
FIG. 1 is a disassembled perspective view showing an LCD device according to an embodiment of the present disclosure.

Reference will now be made in detail to the embodiments of the present disclosure, examples of which are illustrated in the accompanying drawings. These embodiments introduced hereinafter are provided as examples in order to convey their spirits to the ordinary skilled person in the art. Therefore, these embodiments might be embodied in a different shape, so are not limited to these embodiments described here. Also, the size and thickness of the device might be expressed to be exaggerated for the sake of convenience in the drawings. Wherever possible, the same reference numbers will be used throughout this disclosure including the drawings to refer to the same or like parts.

Figure 2:
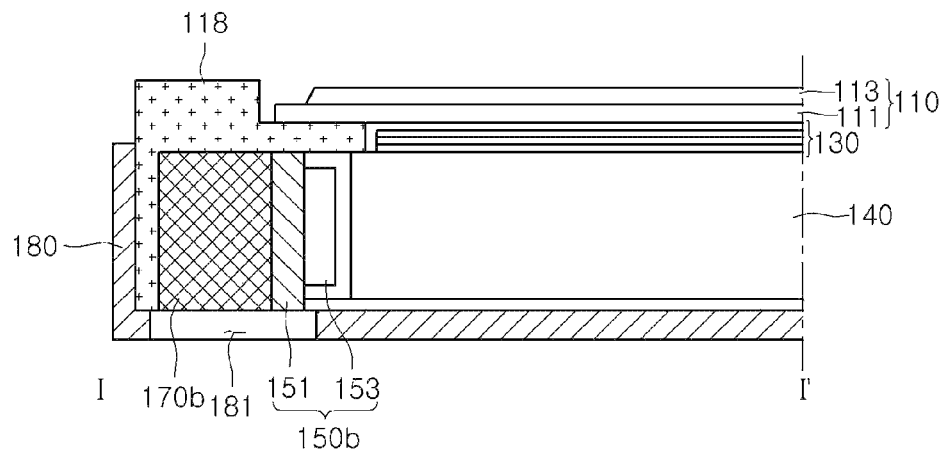
FIG. 2 is a cross-sectional view showing the LCD device taken along a line I-I' in FIG. 1.
Figure 3:
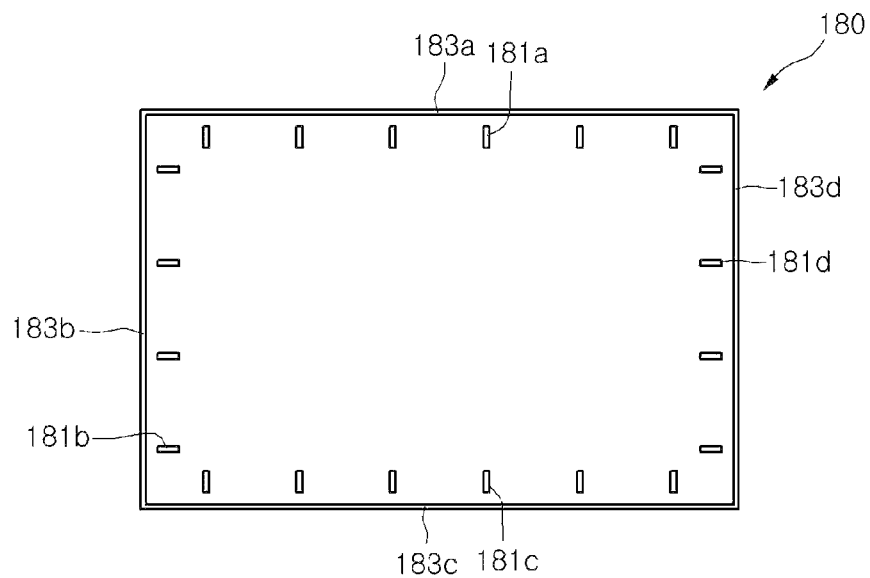
FIG. 3 is a planar view showing a bottom cover according to an embodiment of the present disclosure.

FIG. 1 is a disassembled perspective view showing an LCD device according to an embodiment of the present disclosure. FIG. 2 is a cross-sectional view showing the LCD device taken along a line I-I' in FIG. 1. FIG. 3 is a planar view showing a bottom cover according to an embodiment of the present disclosure.

Referring to FIGS. 1 to 3, an LCD device according to an embodiment of the present disclosure includes an LCD panel 110 configured to display images, a backlight unit 120 disposed under the LCD panel 110 and configured to apply light to the LCD panel 110, and a panel guider 118 configured to support edges of the rear surface of the LCD panel 110. The panel guider 118 is combined with the backlight unit 120.

Although it is not shown in detail in the drawings, the LCD panel 110 includes a thin film transistor substrate 113 and a color filter substrate 111 disposed opposite each other and combined to uniformly maintain a cell gap between them, as well as a liquid crystal layer (not shown) interposed between the two substrates 111 and 113. On the thin film transistor substrate 113, a plurality of gate lines are formed, a plurality of data lines are formed to cross the plurality of gate lines, and a plurality of transistors TFT are formed at the intersections of the plurality of gate lines and the plurality of data lines. The color filter substrate 111 includes color filters which are formed opposite pixels, respectively.

The LCD device further includes a gate driving printed-circuit-board (PCB) 103 and a data driving PCB 101 disposed by the sides of the LCD panel 110. The gate driving PCB 103 sequentially applies a scan signal to the gate lines on the LCD panel 110. The data driving PCB 101 applies data signals to the data lines on the LCD panel 110. To this end, the gate and data driving PCBs 103 and 101 are electrically connected to the LCD panel 110 by means of COFs (chip on film) 105. The COFs 105 can be replaced with tape carrier packages (TCPs).

The backlight unit 120 includes a box-shaped bottom cover 180 with an opened upper surface, first to fourth light source modules 150a to 150d arranged on inner side surfaces of the bottom cover 180, a light guide plate 140 disposed between the first to fourth light source modules 150a to 150d, optical sheets 130 disposed on the light guide plate 140, and a reflection sheet 160 disposed under the light guide plate 140. The light guide plate 140 is configured to convert spotted incident lights from the first through fourth light source modules 150a through 150d into a two-dimensional light. The optical sheets 130 are configured to diffuse and converge the two-dimensional light entered from the light guide plate 140. The reflection sheet 160 reflects light progressing downward from the light guide plate 140 toward the optical sheets 130. The first through fourth light source modules 150a through 150d are configured to each include a metal PCB 151 and a plurality of LEDs 153 loaded on the metal PCB.

The backlight unit 120 further includes first to fourth heat radiation plates 170a to 170d each disposed between the first to fourth light source modules 150a to 150d and the inner side surfaces of the bottom cover 180. The first through fourth heat radiation plates 170a through 170d are used to rapidly transfer heat generated in the first through fourth light source modules 150a through 150d toward the bottom cover 180.

The box-shaped bottom cover 180 with the opened upper surface is configured to include a bottom surface and first to fourth side surfaces 183a to 183d. Also, the bottom cover 180 is further configured to include a plurality of slits formed along lines which are separated by a fixed distance from the first to fourth side surfaces 183a to 183d. In other words, the plurality of slits are formed at a fixed interval along edges of the bottom surface of the bottom cover 180.

The plurality of slits 181 include first to fourth slits 181a to 181d with a bar shape. The first slits 181a are formed on an edge of the bottom surface adjacent to the first side surface 183a. The second slits 181b are formed on another edge of the bottom surface adjacent to the second side surface 183b. The third slits 181c are formed on still another edge of the bottom surface adjacent to the third side surface 183c. The fourth slits 181d are formed on further still another edge of the bottom surface adjacent to the fourth side surface 183d. Each of the first to fourth slits 181a to 181d is formed to extend perpendicularly to the longitude direction of the respective side surface 183a to 183d.

Also, the plurality of slits 181 with the first to fourth slits 181a to 181d are formed on the edge region of the bottom surface opposite to the first through fourth light source modules 150a though 150d and the first through fourth heat radiation plates 170a through 170d. As such, heat, which is transferred from the first through fourth light source modules 150a through 150d via the first through fourth heat radiation plates 170a through 170d toward the bottom cover 180 (more specifically, the first through fourth side surfaces 183a through 183d), can be partially bypassed to the exterior of the bottom cover 180 via the plurality of slits 181. In other words, the plurality of slits 181 eases the local concentration of heat in a region of the bottom cover 180 on which the first through fourth light source modules 150a through 150d and the first through fourth heat radiation plates 170a through 170d are arranged. Therefore, thermal deformation of the bottom cover 180 caused by the local concentration of heat can be minimized.

Although the LCD device according to an embodiment of the present disclosure is described to have the configuration that the plurality of slits 181 are separated by a fixed distance from the side surfaces 183*a* through 183*d* of the bottom cover 180, it is not limited to this. For example, the plurality of slits 181 can be formed opposite the lower surfaces of the first through four light source modules 150*a* through 150*d* and first through fourth heat radiation plates 170*a* through 170*d*, as well as the side surfaces of the first through fourth heat radiation plates 170*a* through 170*d*. In other words, the plurality of slits 181 can be positionally changed in the formation.

Also, the LCD device according to an embodiment of the present disclosure is disclosed to include the first through fourth light source modules 150*a* through 150*d* disposed on all the inner side surfaces of the bottom cover 180. However, the LCD device can be configured to include at least one light source module disposed on at least one inner side surface of the bottom cover 180 according to design specifications.

Moreover, the plurality of slits 181 provides extra space making it possible for the bottom cover 180 to expand and contract with heat. Therefore, the thermal deformation of the bottom cover 180 can be prevented.

In this manner, the LCD device according to an embodiment of the present disclosure can prevent the thermal deformation of the bottom cover 180 caused by the heat which are generated in the first through fourth light source modules 150*a* through 150*d* and concentrated to the side surfaces 183*a* through 183*d* of the bottom cover 180. As such, damage of components within the LCD device can be prevented.

Furthermore, the LCD device according to an embodiment of the present disclosure can prevent the brightness deterioration derived from the thermal deformation of the bottom cover 180. Therefore, the LCD device can improve displaying quality.

Figure 4:
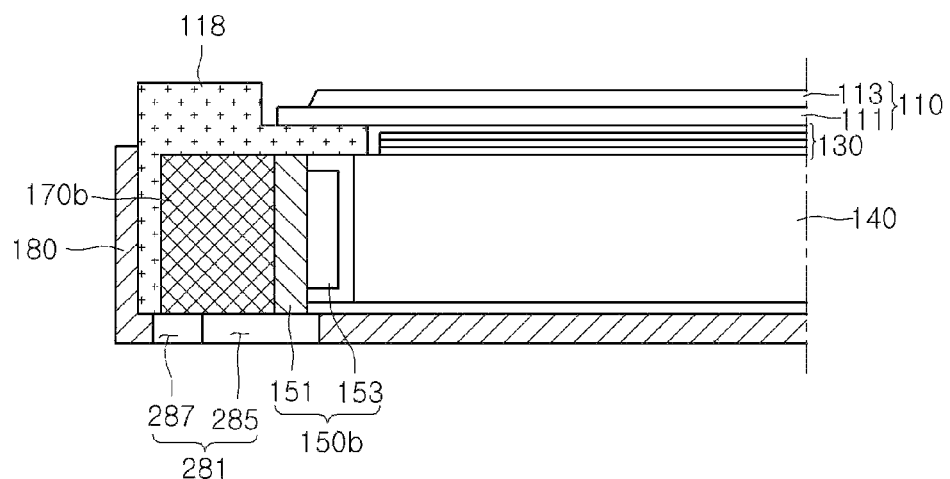
FIG. 4 is a cross-sectional view showing an LCD device according to another embodiment of the present disclosure.
Figure 5:
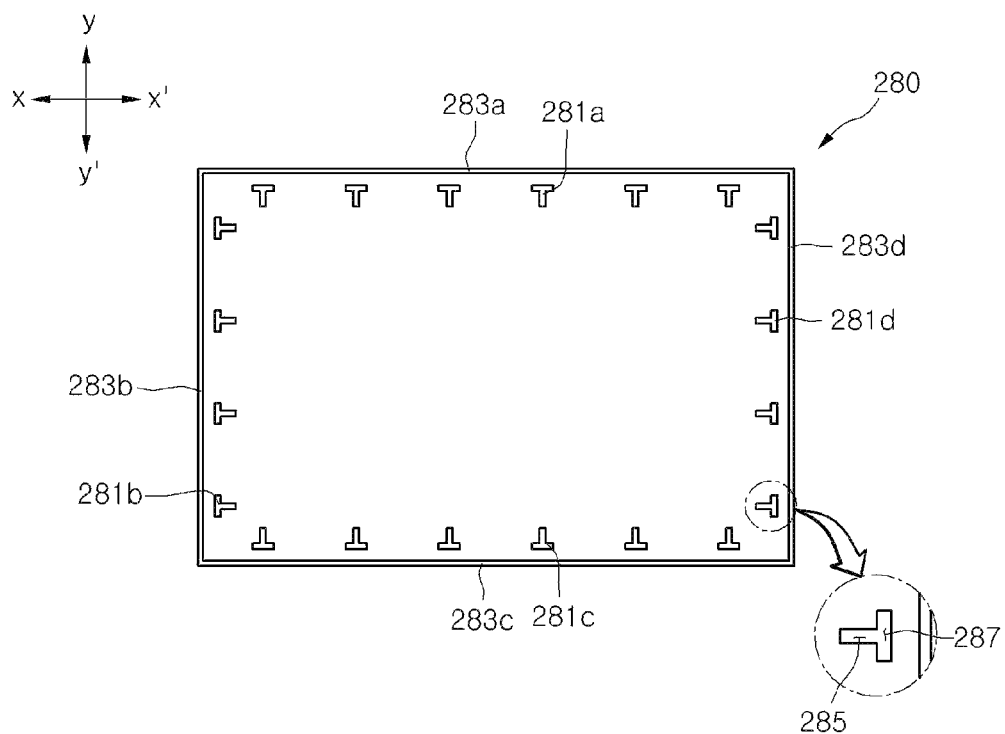
FIG. 5 is a planar view showing a bottom cover according to another embodiment of the present disclosure.

FIG. 4 is a cross-sectional view showing an LCD device according to another embodiment of the present disclosure. FIG. 5 is a planar view showing a bottom cover according to another embodiment of the present disclosure.

The LCD device of another embodiment in FIGS. 4 and 5 has the same configuration as that according to an embodiment of the present disclosure shown in FIGS. 1 and 3, with the exception of a bottom cover 280. As such, the rest of the LCD device according to another embodiment without the bottom cover 280 will be referred to with the same numbers as those according to that embodiment of FIGS. 1 to 3. Moreover, the detailed description for the rest of the LCD device of another embodiment without the bottom cover 280 will be omitted.

A bottom cover 280 according to another embodiment of the present disclosure is formed in a box-shape with the opened upper surface. The bottom cover 280 is configured to include a bottom surface and first to fourth side surfaces 283*a* to 283*d*. Also, the bottom cover 280 is further configured to include a plurality of slits 281 formed along lines which are separated by a fixed distance from the first to fourth side surfaces 283*a* to 283*d*. In other words, the plurality of slits 281 are formed at a fixed interval along edges of the bottom surface of the bottom cover 280.

The plurality of slits 281 is formed on the bottom surface opposite to the first through fourth light source modules 150*a* through 150*d* and the first through fourth heat radiation plate 170*a* through 170*d*. Also, the plurality of slits 281 includes first to fourth slits 281*a* to 281*d* with a "T" shape. The first slits 281*a* are formed on an edge of the bottom surface adjacent to the first side surface 283*a*. The second slits 281*b* are formed on another edge of the bottom surface adjacent to the second side surface 283*b*. The third slits 281*c* are formed on still another edge of the bottom surface adjacent to the third side surface 283*c*. The fourth slits 281*d* are formed on further still another edge of the bottom surface adjacent to the fourth side surface 283*d*.

Each of the first through fourth slits 281*a* through 281*d* is formed to have a first hole pattern 287 parallel to the respective side surface 283*a* through 283*d*, and a second hole pattern 285 perpendicular to the first hole pattern 287. The second hole pattern 285 is formed to extend from an middle portion of the first hole pattern toward an inner side of the bottom surface. Consequently, the plurality of slits 281 is formed all in a "T" shape.

The first hole pattern 287 is used to prevent a thermal deformation of the bottom cover 280 in a direction parallel to the respective side surface 283 of the bottom cover 280. The second hole pattern 285 is used to prevent another thermal deformation of the bottom cover 280 in another direction perpendicular to the respective side surface 283 of the bottom cover 280. For example, the first hole pattern 287 included in the fourth slit 281*d* prevents a thermal deformation of the bottom cover 280 in a first direction of x-x', and the second hole pattern 285 included in the fourth slit 281 prevents another thermal deformation of the bottom cover 280 in a second direction of y-y'.

Consequently, the plurality of slits 281 provides extra space making it possible for the bottom cover 280 to expand and contract with heat. As such, the thermal deformation of the bottom cover 280 in the first and second directions of x-x' and y-y' can be prevented.

As described above, the LCD device according to another embodiment of the present disclosure can prevent the thermal deformation of the bottom cover 280 caused by the heat which is generated in the first through fourth light source modules 150*a* through 150*d* and concentrated to the side surfaces 283 of the bottom cover 280. As such, damage of components within the LCD device can be prevented.

Furthermore, the LCD device according to another embodiment of the present disclosure can prevent the brightness deterioration derived from the thermal deformation of the bottom cover 180. Therefore, the LCD device can improve display quality.

Figure 6:
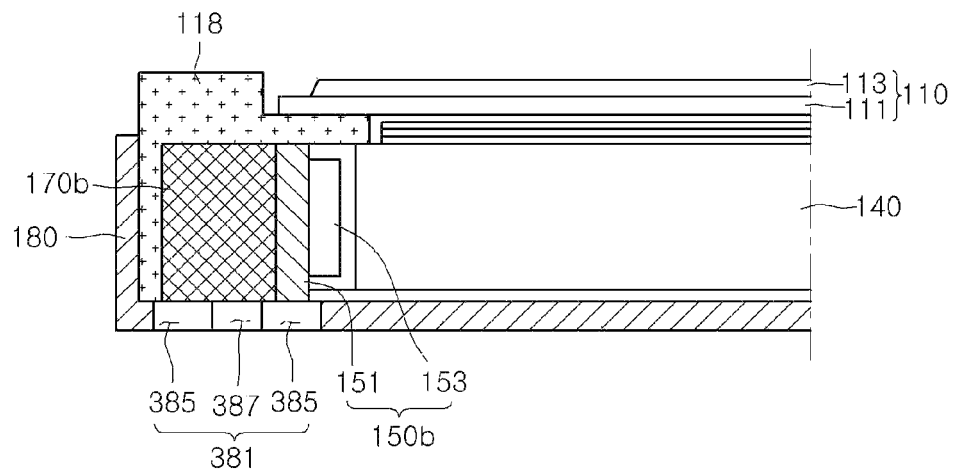
FIG. 6 is a cross-sectional view showing an LCD device according to still another embodiment of the present disclosure.
Figure 7:
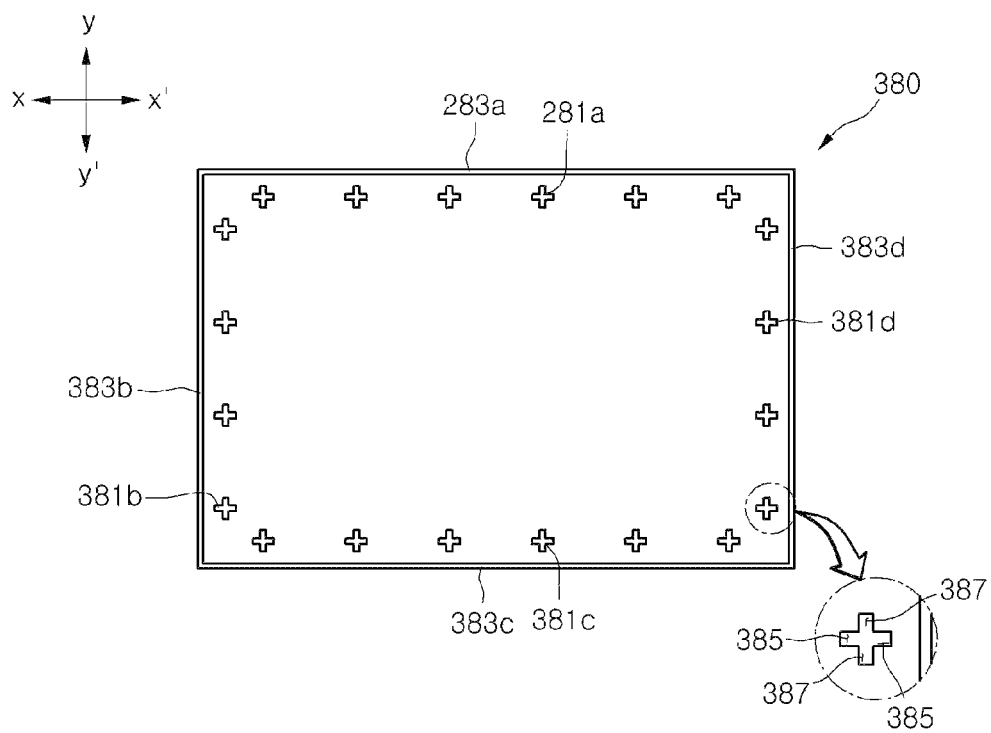
FIG. 7 is a planar view showing a bottom cover according to still another embodiment of the present disclosure.

FIG. 6 is a cross-sectional view showing an LCD device according to still an embodiment of the present disclosure. FIG. 7 is a planar view showing a bottom cover according to still another embodiment of the present disclosure.

The LCD device of still another embodiment in FIGS. 6 and 7 has the same configuration as that according to an embodiment of the present disclosure shown in FIGS. 1 and 3, with the exception of a bottom cover 380. As such, the rest of the LCD device according to still another embodiment without the bottom cover 380 will be referred to with the same numbers as those according to that embodiment of FIGS. 1 to 3. Moreover, the detailed description for the rest of the LCD device of still another embodiment without the bottom cover 380 will be omitted.

A bottom cover 380 according to still another embodiment of the present disclosure is formed in a box-shape with an opened upper surface. The bottom cover 380 is configured to include a bottom surface and first to fourth side surfaces 383*a* to 383*d*. Also, the bottom cover 380 is further configured to include a plurality of slits 381 formed along lines which are separated by a fixed distance from the first to fourth side surfaces 383*a* to 383*d*. In other words, the plurality of slits 381 are formed at a fixed interval along edges of the bottom surface of the bottom cover 380.

The plurality of slits 381 is formed on the bottom plate opposite to the first through fourth light source modules (150a through 150d in FIG. 1) and the first through fourth heat radiation plate (170a through 170d in FIG. 1). Also, the plurality of slits 381 includes first to fourth slits 381a to 381d with a shape of "+". The first slits 381a are formed on an edge of the bottom surface adjacent to the first side surface 383a. The second slits 381b are formed on another edge of the bottom surface adjacent to the second side surface 383b. The third slits 381c are formed on still another edge of the bottom surface adjacent to the third side surface 383c. The fourth slits 381d are formed on further still another edge of the bottom surface adjacent to the fourth side surface 383d.

Each of the first through fourth slits 381a through 381d is formed to have a first hole pattern 387 parallel to a longitude direction of the respective side surface 383, and a second hole pattern 385 perpendicular to the first hole pattern 387. The first and second hole patterns 387 and 385 are formed to cross each other, so that their middle portions are overlapped with each other. Consequently, the plurality of slits 381 is formed all in the shape of "+".

The first hole pattern 387 is used to prevent a thermal deformation of the bottom cover 380 in a direction parallel to the respective side surface 383 of the bottom cover 380. The second hole pattern 385 is used to prevent another thermal deformation of the bottom cover 380 in another direction perpendicular to the respective side surface 383 of the bottom cover 380. For example, the first hole pattern 387 included in the fourth slit 381d prevents a thermal deformation of the bottom cover 380 in a first direction of x-x', and the second hole pattern 385 included in the fourth slit 381d prevents another thermal deformation of the bottom cover 380 in a second direction of y-y'.

Consequently, the plurality of slits 381 provides extra space making it possible for the bottom cover 380 to expand and contract with heat. As such, the thermal deformation of the bottom cover 380 in the first and second directions of x-x' and y-y' can be prevented.

In this way, the LCD device according to still another embodiment of the present disclosure can prevent the thermal deformation of the bottom cover 380 caused by the heat which is generated in the first through fourth light source modules 150a through 150d and concentrated to the side surfaces of the bottom cover 380. As such, damage of components within the LCD device can be prevented.

Moreover, the LCD device according to still another embodiment of the present disclosure can prevent the brightness deterioration derived from the thermal deformation of the bottom cover 380. Therefore, the LCD device can improve display quality.

Although the present disclosure has been limitedly explained regarding only the embodiments described above, it should be understood by the ordinary skilled person in the art that the present disclosure is not limited to these embodiments, but rather that various changes or modifications thereof are possible without departing from the spirit of the present disclosure. Accordingly, the scope of the present disclosure shall be determined only by the appended claims and their equivalents.

What is claimed is:

1. A backlight unit comprising:
a bottom cover with an opened upper surface;
a printed-circuit-board disposed on at least one inner side surface of the bottom cover;
a plurality of LEDs loaded on the printed-circuit-board;
a heat radiation plate between the printed-circuit-board and the at least one inner side surface of the bottom cover; and
a plurality of slits formed on at least one edge of the bottom cover opposite to the printed-circuit-board and configured to reduce thermal deformation of the bottom cover,
wherein the printed-circuit-board is formed to include a metal material,
wherein the heat radiation plate is exposed to an exterior of the bottom cover,
wherein the bottom cover has a bottom surface and the first to fourth side surfaces, and
wherein the plurality of slits is formed on the bottom surface of the at least one edge of the bottom cover.

2. The backlight unit claimed as claim 1, wherein the plurality of slits is formed to extend perpendicularly to a longitude direction of the side surface of the bottom cover.

3. The backlight unit claimed as claim 1, wherein, the slit is configured to include a first hole pattern formed in a first direction which corresponds to a longitude direction of the side surface of the bottom cover, and a second hole pattern formed in a second direction perpendicular to the first direction.

4. The backlight unit claimed as claim 3, wherein the slit is formed in a "T" shape.

5. The backlight unit claimed as claim 3, wherein the slit is formed in a shape of "+".

6. The backlight unit claimed as claim 1, wherein the printed-circuit-board is disposed on all the inner side surfaces of the bottom cover.

7. A liquid crystal display device comprising:
a liquid crystal display panel;
a bottom cover configured to include an opened upper surface and disposed under the liquid crystal display panel;
a printed-circuit-board disposed on at least one inner side surface of the bottom cover;
a plurality of LEDs loaded on the printed-circuit-board;
a heat radiation plate between the printed-circuit-board and the at least one inner side surface of the bottom cover; and
a plurality of slits formed on at least one edge of the bottom cover opposite to the printed-circuit-board and configured to reduce thermal deformation of the bottom cover,
wherein the printed-circuit-board is formed to include a metal material, and
wherein the heat radiation plate is exposed to an exterior of the bottom cover,
wherein the bottom cover has a bottom surface and the first to fourth side surfaces, and
wherein the plurality of slits is formed on the bottom surface of the at least one edge of the bottom cover.

8. The liquid crystal display device claimed as claim 7, wherein the plurality of slits is formed to extend perpendicularly to the side direction of the side surface of the bottom cover.

9. The liquid crystal display device claimed as claim 7, wherein, the slit is configured to include a first hole pattern formed in a first direction which corresponds to a longitude direction of the side surface of the bottom cover, and a second hole pattern formed in a second direction perpendicular to the first direction.

10. The liquid crystal display device claimed as claim 9, wherein the slit is formed in a "T" shape.

11. The liquid crystal display device claimed as claim 9, wherein the slit is formed in a shape of "+".

12. The liquid crystal display device claimed as claim 7, wherein the printed-circuit-board is disposed on all the inner side surfaces of the bottom cover.

\* \* \* \* \*